United States Patent Office 2,852,547
Patented Sept. 16, 1958

2,852,547

HALOGEN SUBSTITUTED BUTENYL SECONDARY ALKYL XANTHATES

Marion W. Harman, Nitro, W. Va., assignor to Monsanto Chemical Company, St. Louis, Mo., a corporation of Delaware No Drawing. Application October 17, 1957
Serial No. 690,628

5 Claims. (Cl. 260—455)

The present invention relates to new compositions of matter of the chemical class which may be described as halogen substituted butenyl secondary alkyl xanthates. These compounds are valuable contact herbicides. In general the halogen substituted alkenyl xanthates containing more than three carbon atoms in the alkenyl group proved to be devoid of herbicidal properties but it was found that halogen substituted butenyl secondary alkyl xanthates were exceptional. Thus, the presence of a secondary alkyl group attached to the oxygen of the xanthate nucleus is critical. The halogen substitutent apparently is not critical and may be chlorine, fluorine, iodine or bromine. More than one halogen substituent is permissible but the halogen should be attached to unsaturated carbon.

The xanthate desired for reaction with the haloalkene is produced in the ordinary manner by reacting in a jacketed vessel equipped with agitation a secondary alcohol, carbon disulfide and an alkali, such as caustic soda or potash. The reaction is carried out at room temperature and the product formed is dissolved in water. Should any water insoluble product be present, it is removed by filtration through paper, clay or by extraction with a solvent such as benzene.

The solution of the xanthate together with about 0.1% its weight of a suitable wetting agent, such as decyl benzene soldium sulfonate, is then placed in a jacketed container, through which jacket may be circulated suitable heating or colling means as desired or required. The container is equipped with an agitator, a reflux condenser and suitable temperature recording means. Thereupon a quantity of halogen substituted 2-butenyl halide substantially equivalent in amount to the weight of xanthate taken, is added as rapidly as possible and the mixture stirred for from 8 to 24 hours. If the temperature of the mass rises excessively it may be controlled by flowing water through the jacket. At the end of the reaction, the heavy oil product is extracted by solvent means, such as ether, chloroform, benzene or heptane, then the extract washed with water until neutral. The solven is removed by heat, preferably under a vacuum of 4 to 10 mm. mercury and the residue heated to 95–100° C. The halogen substituted butenyl xanthates are oils, of a pale yellow to amber color, particularly after standing for a few hours. They are insoluble or only very slightly soluble in water and are very soluble in ether, acetone, alcohol, ethyl acetate, chloroform, heptane and benzene.

Useful properties as herbicides are illustrated by applying the halogen substituted butenyl secondary alkyl xanthates in spray form to 10 to 14 day old specimens of a typical grass and broadleaf plants and observing the phytotoxicity. The phytotoxicity was recorded according to the following key:

RATING KEY FOR PHYTOTOXICITY

| | |
|---|---|
| No phytotoxicity | 0 |
| Slight phytotoxicity | 1 |
| Moderate phytotoxicity | 2 |
| Severe phytotoxicity | 3 |
| Dead | 4 |
| Defoliation | B |

Typical results are recorded below:

Table I

| Toxicant | Concentrated, (percent) | Phytotoxicity | | |
|---|---|---|---|---|
| | | Grass | Bean | Mixed Broadleaf |
| 3-Chloro-2-butenyl isopropylxanthate | 1 | 2 | 2 | 3 |
| 3-Chloro-2-butenyl sec. butylxanthate | 1 | 4 | 1 | 3 |
| 3-Chloro-2-butenyl ethylxanthate | 1 | 0 | 0 | |
| 3-Chloro-2-butenyl amylxanthate | 1 | 0 | 0 | |

It will be noted that the esters of the n-alkyl xanthates were devoid of herbicidal properties.

It is intended to cover all changes and modifications of the examples of the invention herein chosen for purposes of disclosure which do not constitute departures from the spirit and scope of the invention.

This application is a continuation-in-part of application Serial No. 516,050, filed June 16, 1955, and now abandoned.

What is claimed is:

1. A halogen substituted butenyl secondary lower alkyl xanthate in which the halogen is linked to unsaturated carbon.

2. A chloro substituted butenyl secondary lower alkyl xanthate in which the chlorine is linked to unsaturated carbon.

3. A xanthate of the greneral structure

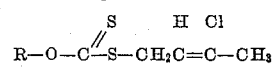

where R represents a lower secondary alkyl group.

4. 3-chloro-2-butenyl isopropylxanthate.

5. 3-chloro-2-butenyl sec-butylxanthate.

No references cited.